United States Patent
Spielmann et al.

(10) Patent No.: US 8,353,562 B2
(45) Date of Patent: Jan. 15, 2013

(54) AXLE BODY

(75) Inventors: Rolf Spielmann, Wertheim-Bittingen (DE); Bjorn Meyer, Osnabruck (DE); Olaf Drewes, Aschaffenburg (DE)

(73) Assignee: Saf-Holland GmbH, Bessenbach (DE)

( * ) Notice: Subject to any disclaimer, the term of this patent is extended or adjusted under 35 U.S.C. 154(b) by 210 days.

(21) Appl. No.: 12/528,939

(22) PCT Filed: Feb. 28, 2008

(86) PCT No.: PCT/EP2008/001589
§ 371 (c)(1),
(2), (4) Date: Aug. 27, 2009

(87) PCT Pub. No.: WO2008/104396
PCT Pub. Date: Sep. 4, 2008

(65) Prior Publication Data
US 2010/0013295 A1  Jan. 21, 2010

(30) Foreign Application Priority Data
Mar. 1, 2007 (DE) .......................... 10 2007 010 021

(51) Int. Cl.
*B60B 35/08* (2006.01)

(52) U.S. Cl. ..................... 301/124.1; 301/131

(58) Field of Classification Search ............... 301/124.1, 301/125, 127, 129, 131, 132; 74/607; 72/260; 264/159
See application file for complete search history.

(56) References Cited

U.S. PATENT DOCUMENTS

| | | | |
|---|---|---|---|
| 1,325,832 A | 12/1919 | Coburn | |
| 1,823,158 A | 9/1931 | Mogford et al. | |
| 1,965,267 A | 7/1934 | Storer | |
| 1,978,685 A * | 10/1934 | Mogford et al. | 228/144 |
| 2,013,786 A | 9/1935 | Mogford et al. | |
| 2,494,128 A * | 1/1950 | Holmquist et al. | 72/340 |
| 2,611,656 A * | 9/1952 | Vanderberg | 301/124.1 |
| 3,668,918 A | 6/1972 | Benteler et al. | |
| 4,380,480 A * | 4/1983 | Delfino et al. | 148/570 |
| 4,616,500 A * | 10/1986 | Alexoff | 72/283 |
| 5,303,985 A | 4/1994 | Barnholt et al. | |
| 5,522,246 A * | 6/1996 | Simon | 72/260 |
| 6,039,336 A | 3/2000 | Frey | |
| 6,585,331 B2 * | 7/2003 | Varela | 301/125 |
| 7,090,309 B2 * | 8/2006 | Blessing et al. | 301/124.1 |

(Continued)

FOREIGN PATENT DOCUMENTS
DE       4231344       3/1993
(Continued)

OTHER PUBLICATIONS
The Oxford Illustrated Dictionary, Edition 1980, definition of "perch", p. 626.

*Primary Examiner* — Kip T Kotter
(74) *Attorney, Agent, or Firm* — Price Heneveld LLP

(57) ABSTRACT

The invention relates to an axle body, particularly for a commercial vehicle, wherein the body is configured substantially as an axle pipe, which comprises a center section and at least one receiving section connected thereto for receiving an axle guide, wherein the axle body in the center section has a substantially constant wall thickness, and wherein the axle body in the receiving section, at least in some regions, has a wall thickness that is greater than the wall thickness of the center section.

5 Claims, 6 Drawing Sheets

U.S. PATENT DOCUMENTS

| | | | |
|---|---|---|---|
| 7,726,027 B2 * | 6/2010 | Fuks et al. | 29/897.2 |
| 2003/0042787 A1 * | 3/2003 | Dopico Varela | 301/125 |
| 2004/0060385 A1 * | 4/2004 | Prucher | 74/607 |
| 2006/0131949 A1 * | 6/2006 | Jahani et al. | 301/124.1 |

FOREIGN PATENT DOCUMENTS

| | | |
|---|---|---|
| DE | 19617929 | 12/1997 |
| DE | 10060312 | 1/2002 |
| WO | 2007/065235 | 6/2007 |

\* cited by examiner

AXLE BODY

BACKGROUND OF THE INVENTION

The present invention pertains to an axle body, a running gear design, a method for making an axle body, as well as a method for making a running gear design, intended especially for a commercial vehicle.

Axle bodies of this kind are known in the prior art. Thus, axle bodies consisting of an axle pipe, a left and a right stub axle, as well as two shells or wraps are used. The axle pipe and the stub axles are joined together essentially concentrically or coaxially by a friction welding method. To provide a connection between the axle pipe and an axle guide, the shells are fastened to the axle pipe by a shielded arc welding method. In this way, the axle guide can be welded all around to the shell, which in turn is joined to the axle pipe by two spot welds arranged at the side. Thus, the encircling weld seam by which the axle guide is fastened need not be made directly on the axle pipe, for such an encircling weld by virtue of the notch effect and the heat influence would lead to a weakening of the axle pipe, so that there would be a danger of the axle pipe breaking.

Therefore, the problem of the present invention is to provide an axle body, a running gear design, a method for making an axle body, as well as a method for making a running gear design, especially for a commercial vehicle, guaranteeing that the axle body is easy and economical to fabricate and at the same time has a high axial and polar section modulus and thus can withstand high loads.

SUMMARY OF THE INVENTION

According to the invention, an axle body is provided, especially for a commercial vehicle, which is basically fashioned as an axle pipe, comprising a center section and at least one adjoining receiving section to receive an axle guide, wherein the axle body in the center section has an essentially constant wall thickness, and the axle body in the receiving section has at least in some regions a wall thickness which is greater than the wall thickness of the center section. The axle body is advantageously fashioned as an axle pipe, though the cross sectional configuration need not necessarily be round, but instead the axle body can have any desired cross sectional configuration. Thus, in particular, the axle body can have an oval or polygonal cross sectional configuration. Preferably, however, the axle body is fashioned as an axle pipe with a round cross section surface. The axle body of the invention can be configured so that the axle body in the receiving section has a wall thickness, at least in some regions, which due to a forming process is greater than the wall thickness of the center section. The forming process can advantageously occur by means of a hot forming process, such as upsetting or forging. In addition or alternatively, the forming process can likewise be implemented by a cold forming process, such as a hydroforming or high-pressure interior forming process. Of course, the increasing of the wall thickness of the center section can likewise be achieved by alternative forming methods. Contrary to the axle bodies known in the prior art, which are made by primary shaping such as casting, a considerably higher strength at lower fabrication cost is achieved by the preferred axle body of the invention, which is made by a forming process.

The axle body has a center section and at least one adjoining receiving section, the receiving section being adjacent to the center section in the axial direction. In particular, the receiving section constitutes an end face or distal end of the axle body. Advisedly, the axle body has a center section with a receiving section arranged at both of its opposite end faces, so that the receiving sections constitute the ends of the axle body. The receiving section serves to receive an axle guide, which can preferably be designed as a longitudinal or transverse link or functional control arm. The axle guide serves in particular to link the vehicle axle or the axle body to a vehicle frame. For this, the axle guide is arranged or received or fastened on the receiving section, while the fastening can be direct or indirect. In its center section, the axle body preferably has an essentially constant wall thickness. In other words, the wall thickness, defined as the difference between outer radius and inner radius (or outer diameter and inner diameter), is essentially constant or equal in the center section of the axle body in the axial direction or longitudinal direction. Of course, any slight deviations in the manufacturing tolerances of the axle pipe should be disregarded as they relate to the constant wall thickness, as this center section has a generally uniform tolerance throughout. Accordingly, the axle body in the receiving section likewise has a wall thickness which is defined in similar manner by the difference between outer radius and inner radius (or outer diameter and inner diameter) of the axle pipe. However, this is greater than the wall thickness of the center section of the axle body. Given the theoretical assumption that an encircling weld produced directly on the axle results in a strength loss of around 50%, it is thus possible to offset this strength loss by the geometrical shape of the axle. Due to the partial thickening of the wall thickness of the axle pipe in the region of the weld between axle guide and axle body, it is thus advantageously possible to do without extra structural parts, such as shells (wraps) to which the axle guide is generally welded, since the axle guide can be welded directly on the axle body. This results, in particular, in cost and weight advantages, so that the production process can be substantially simplified. The axle body, in particular in the region of the receiving section and/or the center section, has a wall thickness which is essentially constant in the radial or circumferential direction. Thus, in other words, the axle body has a wall of essentially equal thickness in the radial or circumferential direction, any manufacturing tolerances or deviations in small regions (such as the corner or edge regions of a quadrangular cross section) being left out of consideration.

Preferably, the outer diameter of the axle body is larger in the receiving section than in the center section. Thus, an axle body is created that arches outward in the region of the receiving section. The inner diameter of the axle body can be formed basically constant over its entire length, so that the inner diameter of the axle body in the region of the receiving section corresponds to that of the axle body in the center section. Of course, however, the inner diameter can also vary, as will be explained below.

Furthermore, preferably, the inner diameter of the axle body is fashioned smaller in the receiving section than in the center section. Accordingly, the outer diameter can be formed basically constant over the entire length of the axle body or, as mentioned above, be variable, especially being larger in the region of the receiving section than in the center region.

Thus, one can provide an axle body having an outer diameter which is larger in the receiving section than in the center region and an inner diameter which is smaller in the receiving section than in the center section, so that a thickening or increased wall thickness is provided overall in both directions (inward and outward) in the receiving section.

Preferably, the axle body is broadened at least in some regions in the receiving section so that the cross section of the axle pipe is enlarged. In particular, the broadening of the axle body in the receiving section occurs such that its diameter is broadened. This broadening can be achieved by the most diverse of forming methods or expanding methods, such as a high-pressure interior forming method, kneading method, or other mechanical interventions. Thus, one can provide an axle body whose receiving section has a greater wall thickness than the center section, while the outer diameter and the inner diameter of the axle body are larger in the region of the receiving section than are those dimensions in the region of the center section. However, the increase in the outer diameter is greater than the increase in the inner diameter, in order to ensure a larger wall thickness.

Advisedly, the wall thickness of the receiving section is basically constant. In other words, the wall thickness of the receiving section is formed basically constant along a lengthwise direction or axial direction, apart from any manufacturing tolerances. Especially advantageously, the outer diameter of the axle body in particular is formed essentially equal or constant in the region of the receiving section along the lengthwise direction.

In one preferred embodiment, the receiving section has a first and a second connection region for arrangement of regions of the axle guide, on which the weld between axle guide and axle body is formed (such as side walls of the axle guide), as well as a center region lying in between, while the wall thickness of the first and second connection regions is larger than the wall thickness of the center section and the center region. Advisedly, the axle body has a receiving section at either end of the center section, so that one axle guide can be arranged at the two end regions. The axle guide is generally designed to have a box shape and thus it has two spaced-apart side walls with a continuous opening, through which the axle body or the receiving section of the axle body stretches. The axle body is welded all around to the side walls of the axle guide. Consequently, the first and second connection regions are spaced apart from each other so that they are flush with the side walls of the axle guide. Of course, the axle guide need not necessarily have side walls, so that the advantageous linking of the axle guide to the axle body generally occurs at those connection regions where the weld is provided between axle guide and axle body. Advantageously, the wall thickness of the first and second connection region is greater than the wall thickness of the center region of the receiving section and/or the center section. Thus, the center region of the receiving section can have essentially the same wall thickness as the center section of the axle body. It is noted that the center region can also have a different wall thickness, preferably a somewhat larger wall thickness than that of the center section. Such a configuration provides an advantageous weight savings and a simplification of the forming process due to the lesser degree of forming.

Preferably, the wall thickness of the center section and the center region is basically the same. This is accomplished in that the axle body is made by an upsetting process, wherein the axle body is only upset in the first and second connection region of the receiving section, so that the center region of the receiving section has or retains the original wall thickness, which essentially corresponds to the wall thickness of the center section of the axle body.

Moreover, preferably the wall thickness of the first connection region is larger than that of the second connection region, and the first connection region is preferably toward the center of the axle. In particular, the axle body can be fashioned such that the outer diameter or radius of the first connection region is larger than that of the second connection region. The first connection region is advantageously toward or closer to the center of the axle or the center section, whereas the second connection region is consequently further away from the center section or the center of the axle. This is especially advantageous, since an optimal force pathway is created between axle guide and axle body, since the larger forces occurring at the side facing the middle of the axle will follow an optimized contour. Furthermore, this prevents transposing or twisting of an axle guide with such a shape.

Advisedly, the axle body furthermore has at least one wheel receiving section, which is arranged at the receiving section. The wheel receiving section, in particular, can be fashioned as a stub axle, with a stub axle being provided advantageously on each side or each end face or each end region, arranged basically concentrically or coaxially to the axle body.

Preferably, the axle body is fashioned as a single piece, i.e., formed from a single piece. For this, the axle body can also be formed integrally or as a single part.

It is thus possible to form the wheel receiving section directly on the axle body, so that the two individual parts of the wheel receiving section (right, left) and any required friction welding process to join the wheel receiving sections to the axle body can be omitted.

Furthermore, according to the invention, there is provided a running gear design, especially for a commercial vehicle, comprising an axle body fashioned as an axle pipe and at least one axle guide, wherein the axle body has a center section and at least one adjoining receiving section to receive the axle guide, wherein the axle body in the center section has an essentially constant wall thickness, and the axle body in the receiving section has at least in some regions a wall thickness which is greater than the wall thickness of the center section. Thus, advantageously, a running gear arrangement is provided in which the axle guide can be arranged or fastened especially advantageously on the receiving section. This fastening can occur, in particular, directly or without an intermediate element (such as a wrap), and an encircling weld between the axle guide and the receiving section of the axle body does not weaken it, due to the increased wall thickness in this region.

Of course, the further features and benefits of the invented axle body as mentioned at the outset can also find application in the running gear design of the invention.

Furthermore, according to the invention, a method is provided for making an axle body, especially for a commercial vehicle, comprising the steps: providing an axle pipe with an essentially constant pipe cross section, having a center section and at least one adjoining receiving section to receive an axle guide, and upsetting and/or forging the receiving section so that an enlargement of the wall thickness of the receiving section is created at least in some regions.

Finally, according to the invention, a method is provided for making a running gear design, especially for a commercial vehicle, comprising the steps: providing at least one axle guide, providing an axle pipe with an essentially constant pipe cross section, having a center section and at least one adjoining receiving section for the arrangement of the axle guide, upsetting and/or forging of the receiving section so that an enlargement of the wall thickness of the receiving section is created at least in some regions, and direct fastening of the axle guide on the receiving section.

Of course, the benefits and features of the invented axle body, as well as the invented running gear design, can likewise find application in the method for making an axle body and a running gear design.

Further benefits and features of the invention will emerge from the following description of preferred embodiments making reference to the enclosed figures, while individual embodiments can be combined with each other to yield new embodiments.

DETAILED DESCRIPTION OF THE PREFERRED EMBODIMENTS

Figure 1:
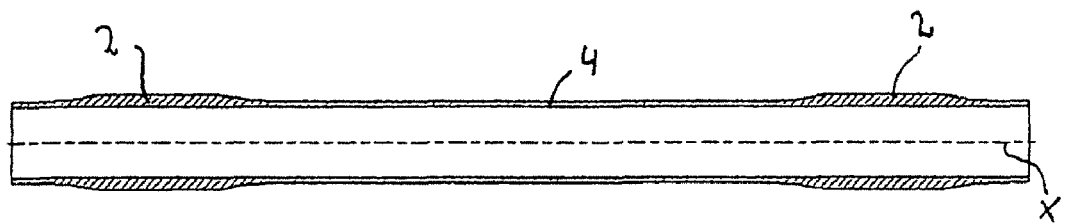
FIG. 1 is a cross-sectional side elevational view of an axle body according to a first embodiment of the invention.

FIG. 1 shows a cross sectional view of a first embodiment of the invented axle body. The axle body comprises at least one receiving section 2 and a center section 4. In the embodiment depicted, the axle body has two receiving sections 2, between which the center section 4 is arranged. The receiving sections 2 thus form the end face regions or distal ends of the axle body. The receiving section 2 and the center section 4 are arranged basically concentrically or coaxially to a lengthwise axis X of the axle body.

The receiving section 2 serves to receive or fasten or arrange an axle guide. The axle guide, in particular, can be designed as a longitudinal link, a transverse link, a functional control arm, etc., and serves to link the axle to a frame of the vehicle. Preferably the fastening of the axle guide to the axle body or its receiving section 2 is direct. In other words, the axle guide is fastened without an intermediate element, such as a wrap, to the receiving section 2 (e.g., by welding). This produces a cost and weight benefit thanks to a considerable simplifying of the production process of the wheel suspension unit or running gear design.

Figure 2:
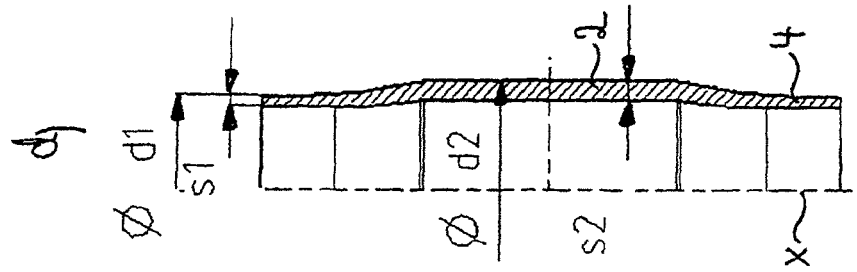
FIG. 2 includes partial cross-sectional side elevational views of receiving sections according to various embodiments of the invention.
Figure 2:
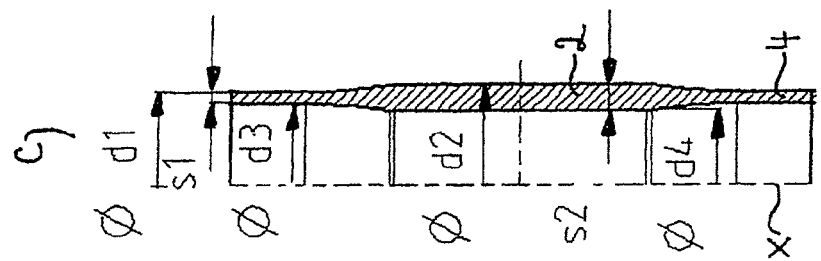
Figure 2:
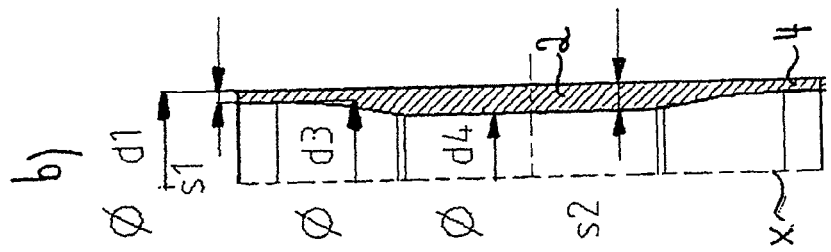
Figure 2:
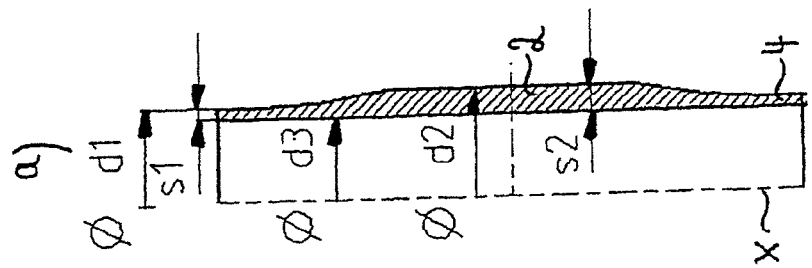

FIG. 2 shows cross section views of various embodiments of the receiving section 2. Thus, FIG. 2a shows a receiving section in which the outer diameter d2 of the axle body in the receiving section 2 is larger than the outer diameter d1 of the center section 4. Advantageously, the inner diameter d3 in the receiving section 2 and center section 4 is equal or constant. Consequently, one gets in the region of the receiving section 2 a wall thickness s2 which is larger than the wall thickness s1 in the region of the center section 4.

In the embodiment represented in FIG. 2b, the axle body is configured such that the inner diameter d4 of the axle body in the region of the receiving section 2 is smaller than the inner diameter d3 of the axle body in the region of the center section 4. The outer diameter d1 of the axle body in this embodiment is essentially the same or constant along the lengthwise axis X in the region of the receiving section 2 and center section 4. Thus, one gets in the region of the receiving section 2 a wall thickness s2 which is greater than the wall thickness s1 in the region of the center section 4.

Of course, in the embodiments represented in FIGS. 2a and 2b the inner diameter and outer diameter need not be constant, but can also increase or decrease in the region of the receiving section 2. This yields the embodiment represented in FIG. 2c, in which the outer diameter d2 of the axle body is larger in the region of the receiving section 2 than the outer diameter d1 in the center section 4, and also the inner diameter d4 of the axle body in the region of the receiving section 4 is smaller than the inner diameter d3 in the region of the center section 4. Consequently, one gets in the region of the receiving section 2 a wall thickness s2 which is larger than the wall thickness s1 in the region of the center section 4.

In the especially advantageous embodiment represented in FIG. 2d, the axle body is broadened in the region of the receiving section 2 so that the axle pipe cross section is enlarged. This is achieved in that both the inner and outer diameter of the axle body are larger in the region of the receiving section 2 than in the region of the center section 4. In order to accomplish an enlargement of the wall thickness s2 in the region of the receiving section 2, the enlargement of the outer diameter is greater than the enlargement of the inner diameter. One gets in the region of the receiving section 2 a wall thickness s2 which is larger than the wall thickness s1 in the region of the center section 4. This embodiment affords an especially advantageous axle body, one which has an especially large axial and polar section modulus and thus can absorb large forces.

Figure 3:
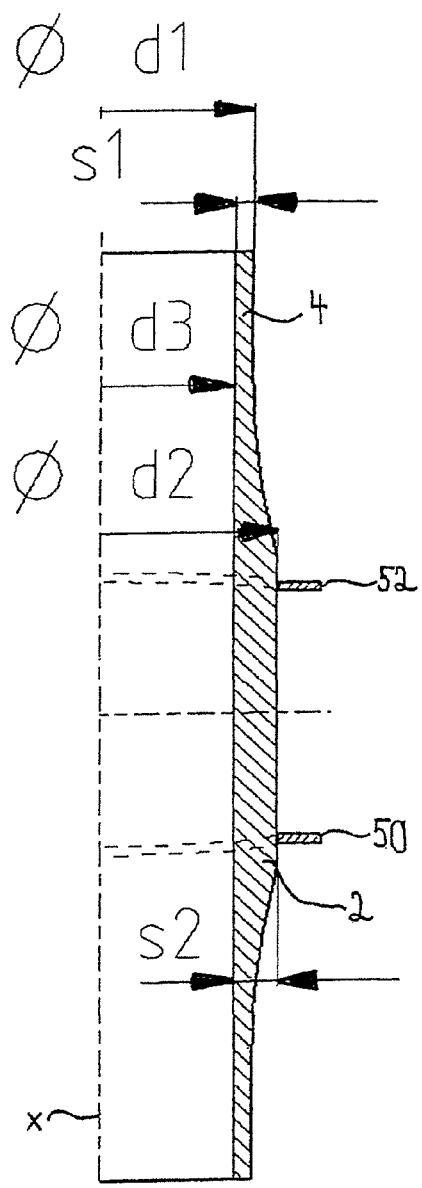
FIG. 3 includes partial cross-sectional side elevational views of receiving sections according to various embodiments of the invention.
Figure 3:
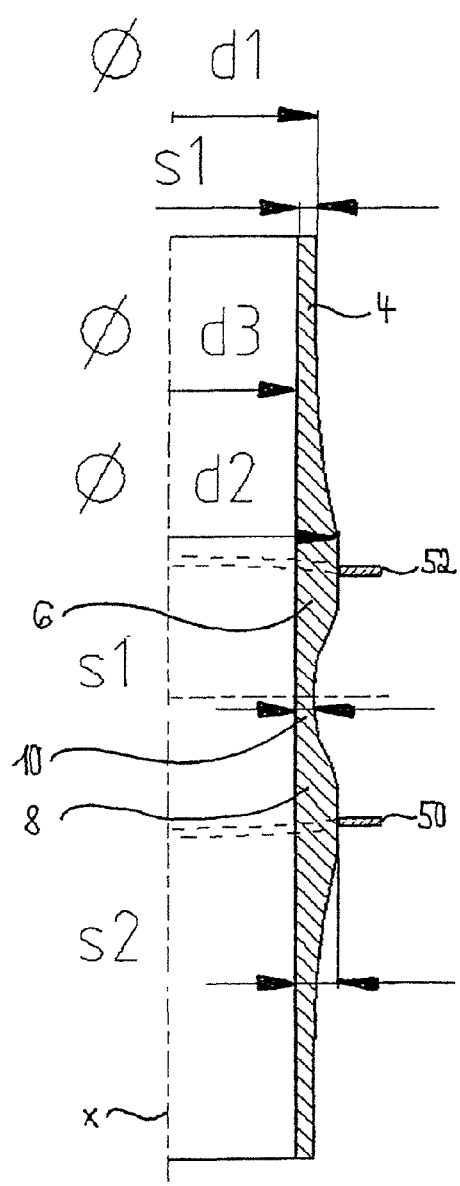
Figure 3:
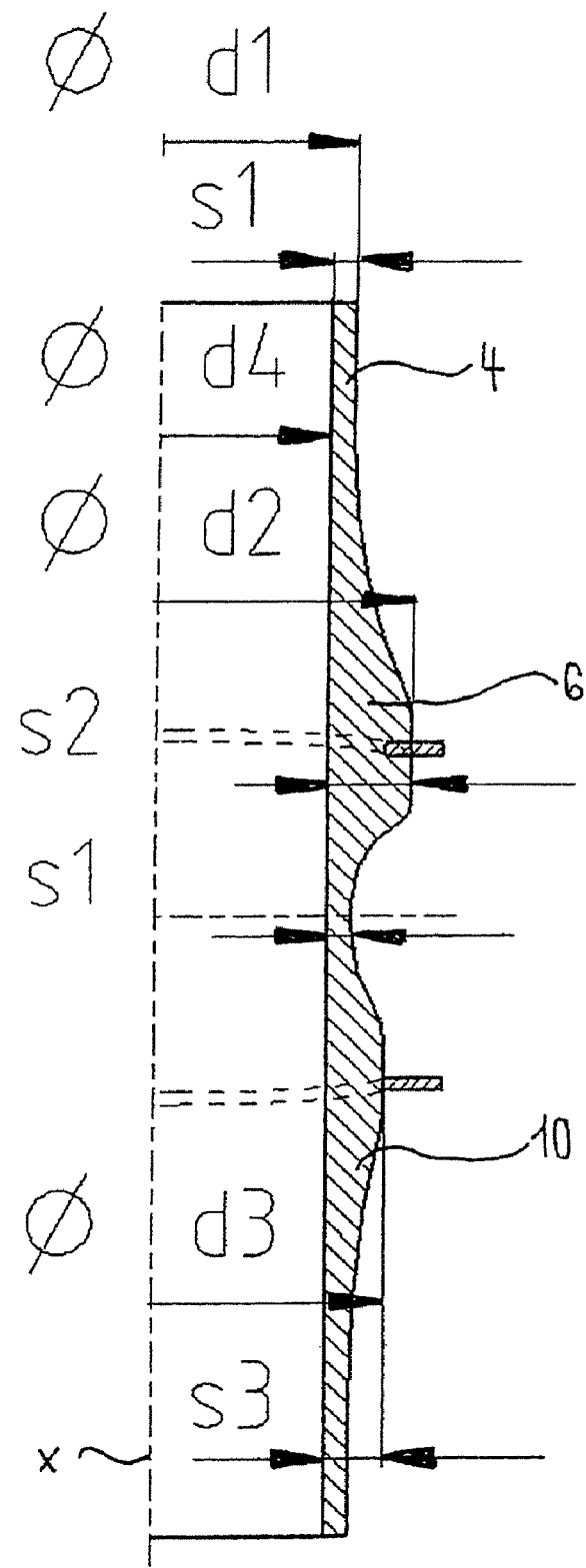

FIG. 3 shows the linking of the axle body to side walls 50, 52 of the axle guide. Naturally, the axle guide need not necessarily have side walls 50, 52, so that the linking of the axle guide to the axle body represented hereafter generally applies to those connection regions where the weld is provided between axle guide and axle body. In FIG. 3a, the axle body is configured such that the wall thickness s2 of the receiving section 2 is basically constant along the longitudinal axis X. On the other hand, in FIG. 3b is shown an embodiment of the axle body having a receiving section 2 which has a first connection region 6 and a second connection region 8. The first and second connection regions 6, 8 serve to receive or fasten the side walls 50, 52 of the axle guide. Between the first connection region 6 and the second connection region 8 lies a center region 10, looking in the direction of the longitudinal axis. Advantageously, the wall thickness s2 of the first and second connection region 6, 8 is greater than the wall thickness s1 of the center region 10. The wall thickness s1 of the center region 10 corresponds with special advantage to the wall thickness s1 of the center section 4.

The embodiment in FIG. 3c differs from the embodiment shown in FIG. 3b in that the wall thickness s2 of the first connection region 6 is greater than the wall thickness s3 of the second connection region 8. Advantageously, the first connection region 6 and the second connection region 8 are arranged such in relation to the axle body that the first connection region 6 faces the middle or center of the axle, while the second connection region 8 faces or is closer to the distal end of the axle body. This leads to an optimal flow of force between the axle guide and the axle body, since the larger forces occurring on the side facing the middle of the axle can follow an optimized contour. Furthermore, by configuring the first and second connection region 6, 8 with different wall thicknesses s2, s3 one can achieve a certainty of no transposing or twisting in regard to the axle guide.

Figure 4:
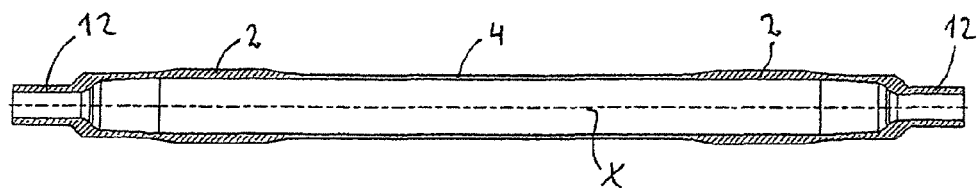
FIG. 4 is a cross-sectional side elevational view of an axle body according to a further embodiment of the invention.

FIG. 4 shows a cross sectional view of a preferred embodiment of the axle body. The axle body in the depicted embodiment has a wheel receiving section 12 at each end face, being configured as a stub axle. The wheel receiving section 12 is arranged or fastened essentially concentric or coaxial to the longitudinal axis X on the receiving section 2. In a one-piece configuration of the axle body, it is advantageous for the wheel receiving sections 12 to be formed directly on the axle body by an upsetting and forging process. Of course, it is possible to form the wheel receiving section 12 on the axle body in combination or in the same manufacturing step as the strengthening of the wall thickness regions of the receiving section 2. However, this can also occur in a separate process. This makes it possible to save further on production costs, since the necessary welding process (or friction welding process) to join the wheel receiving section 12 to the axle body is eliminated.

Figure 5:
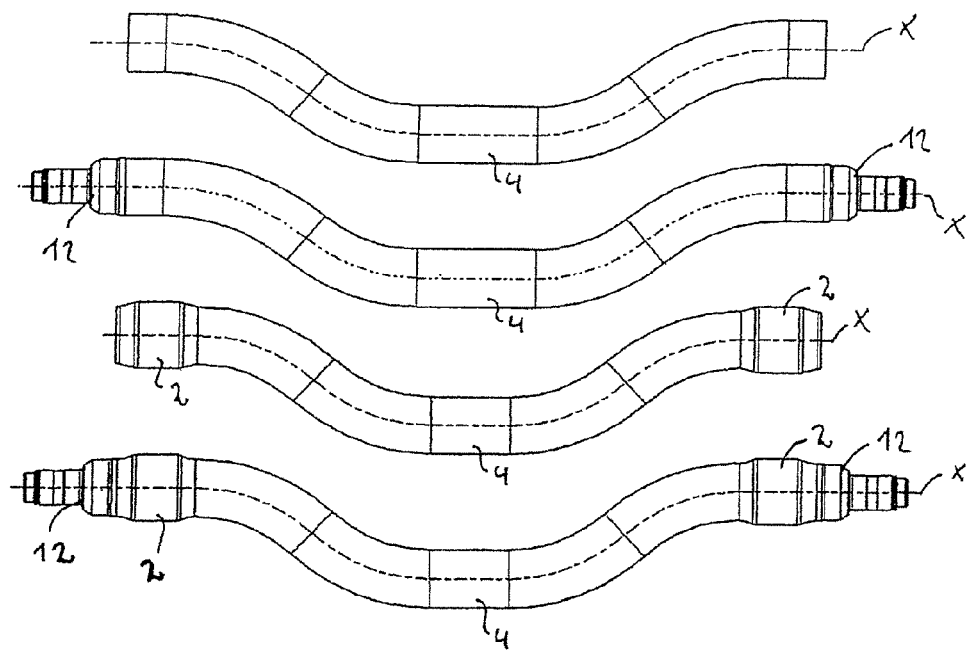
FIG. 5 includes side elevational views of axle bodies according to further embodiments of the invention.

The forming process used to enlarge the wall thickness in the region of the receiving section 2 (such as an upsetting and forging process) can likewise be used for the shaping of the entire axle body, as shown in FIG. 5. In this way, it is possible to make an axle body whose central region or center section 4 at least in some regions is displaced preferably in only one plane (a displacement in two planes is likewise possible), so that a so-called drop-center axle is the result. This forming process is possible for a single axle body, an axle body with direct forged wheel receiving sections 12, and an axle body according to the invention with partial thickening (i.e., increased wall thickness) and forged-on wheel receiving sections. An axle body formed in this way offers the possibility of affording especially space-optimized running gear designs.

Figure 6:
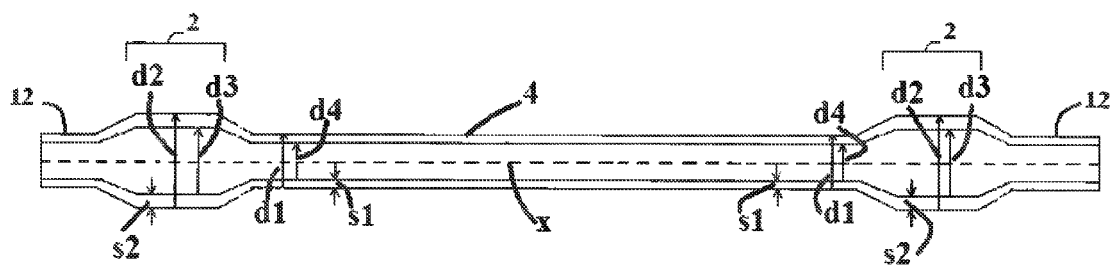
FIG. 6a is a cross-sectional side elevational view of an axle body according to another embodiment of the invention.

Referring now to FIG. 6a, an axle body is shown comprising a center section 4 and at least one adjoining receiving section 2 adapted to couple to an axle guide. The center section 4 of the axle body has an essentially constant wall thickness s1, and the receiving section 2 of the axle body a wall thickness s2 which is greater than the wall thickness s1 of the center section 4 due to a forming process described above. As shown in FIG. 6a, an outer diameter d2 of the receiving section 2 of the axle body is larger than an outer diameter d1 of the center section 4 of the axle body. As further shown in FIG. 6a, an inner diameter d3 of the receiving section 2 of the axle body is larger than an inner diameter d4 of the center section 4 of the axle body.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An axle body, comprising:
    a center section, at least one adjoining receiving section adjacent to the center section in an axial direction and adapted to couple to an axle guide, and at least one wheel receiving section disposed at an end region of the axle body;
    wherein the center section of the axle body has an essentially constant wall thickness;
    wherein the receiving section of the axle body has at least in some regions a wall thickness which is greater than the wall thickness of the center section due to a forming process;
    wherein an outer diameter of the receiving section of the axle body is larger than an outer diameter of the center section of the axle body; and
    wherein an inner diameter of the receiving section of the axle body is constant and larger than an inner diameter of the center section of the axle body.

2. The axle body according to claim 1, wherein the axle body is broadened at least in some regions in the receiving section so that the cross section of the axle pipe is enlarged.

3. The axle body according to claim 1, wherein the wall thickness of the receiving section is substantially constant.

4. The axle body according to claim 1, wherein the axle body is fashioned as a single piece.

5. An axle body, comprising:
    a center section, a wheel receiving section, and at least one receiving section disposed between the center section and the wheel receiving section and adapted to couple to an axle guide, wherein the receiving section includes an overall length;
    wherein the center section of the axle body has an essentially constant wall thickness;
    wherein the receiving section of the axle body has at least in some regions a wall thickness which is greater than the wall thickness of the center section, wherein the receiving section is integral with the axle body along substantially the entire overlay length of the receiving section; and
    wherein an outer diameter of the receiving section of the axle body is constant and further wherein the outer diameter of the receiving section is larger than an outer diameter of the center section of the axle body;
    wherein an inner diameter of the receiving section of the axle body is constant and further wherein the inner diameter of the receiving section is larger than an inner diameter of the center section of the axle body.

* * * * *